(12) United States Patent
Madan et al.

(10) Patent No.: US 12,517,669 B2
(45) Date of Patent: Jan. 6, 2026

(54) SCHEDULING PROCESSING-IN-MEMORY REQUESTS AND MEMORY REQUESTS

(71) Applicant: Advanced Micro Devices, Inc., Santa Clara, CA (US)

(72) Inventors: Niti Madan, Bee Cave, TX (US); Johnathan Robert Alsop, Seattle, WA (US); Alexandru Dutu, Kirkland, WA (US); Mahzabeen Islam, Dripping Springs, TX (US); Yasuko Eckert, Redmond, WA (US); Nuwan S Jayasena, Cupertino, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 195 days.

(21) Appl. No.: 17/954,784

(22) Filed: Sep. 28, 2022

(65) Prior Publication Data
US 2024/0103745 A1 Mar. 28, 2024

(51) Int. Cl.
*G06F 3/06* (2006.01)
(52) U.S. Cl.
CPC ............ *G06F 3/064* (2013.01); *G06F 3/0613* (2013.01); *G06F 3/0659* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 5,101,485 A | 3/1992 | Perazzoli, Jr. | |
| 6,694,400 B1 * | 2/2004 | Lai | G06F 13/4217 710/305 |
| 9,836,232 B1 * | 12/2017 | Vasquez | G06F 12/0804 |
| 9,892,803 B2 * | 2/2018 | Reed | G06F 12/0811 |
| 10,768,859 B1 | 9/2020 | Kim et al. | |
| 10,891,228 B2 * | 1/2021 | Steinmacher-Burow | G06F 12/0817 |
| 12,032,925 B1 | 7/2024 | Kim et al. | |
| 12,033,710 B2 | 7/2024 | Wong et al. | |
| 12,066,950 B2 | 8/2024 | Madan et al. | |

(Continued)

FOREIGN PATENT DOCUMENTS

WO 2024072862 A1 4/2024

OTHER PUBLICATIONS

U.S. Appl. No. 17/953,723 , "Non-Final Office Action", U.S. Appl. No. 17/953,723, Jun. 11, 2024, 13 pages.

(Continued)

*Primary Examiner* — Christopher D Birkhimer
(74) *Attorney, Agent, or Firm* — FIG. 1 Patents (57) ABSTRACT

A memory controller coupled to a memory module receives both processing-in-memory (PIM) requests and memory requests from a host (e.g., a host processor). The memory controller issues PIM requests to one group of memory banks and concurrently issues memory requests to one or more other groups of memory banks. Accordingly, memory requests are performed on groups of memory banks that would otherwise be idle while PIM requests are performed on the one group of memory banks. Optionally, the memory controller coupled to the memory module also takes various actions when switching between operating in a PIM mode and a non-processing-in-memory mode to reduce or hide overhead when switching between the two modes.

20 Claims, 7 Drawing Sheets

(56) References Cited

U.S. PATENT DOCUMENTS

| | | | |
|---|---|---|---|
| 12,131,026 B2 | 10/2024 | Dutu et al. | |
| 12,204,774 B2 | 1/2025 | Dutu et al. | |
| 12,236,134 B2 | 2/2025 | Islam et al. | |
| 2011/0161784 A1* | 6/2011 | Selinger | G06F 11/1016 |
| | | | 714/E11.002 |
| 2012/0069034 A1 | 3/2012 | Biswas et al. | |
| 2014/0325148 A1* | 10/2014 | Choi | G06F 3/0659 |
| | | | 711/114 |
| 2014/0365719 A1* | 12/2014 | Kuzmin | G06F 12/0246 |
| | | | 711/103 |
| 2015/0187043 A1 | 7/2015 | Shebanow et al. | |
| 2016/0246713 A1* | 8/2016 | Choi | G06F 3/0608 |
| 2017/0300422 A1* | 10/2017 | Szubbocsev | G06F 12/1009 |
| 2018/0188970 A1 | 7/2018 | Liu et al. | |
| 2019/0034097 A1 | 1/2019 | Chang et al. | |
| 2019/0065115 A1* | 2/2019 | Kwon | G06F 3/0673 |
| 2019/0079678 A1* | 3/2019 | Malladi | G06F 13/4243 |
| 2019/0392886 A1 | 12/2019 | Cox et al. | |
| 2020/0050397 A1* | 2/2020 | Meyerowitz | G06F 3/0659 |
| 2020/0174749 A1 | 6/2020 | Kang et al. | |
| 2020/0294558 A1 | 9/2020 | Yu et al. | |
| 2020/0356305 A1 | 11/2020 | Kim et al. | |
| 2021/0110876 A1 | 4/2021 | Seo et al. | |
| 2021/0150311 A1 | 5/2021 | Zhou et al. | |
| 2021/0182190 A1 | 6/2021 | Gao et al. | |
| 2021/0271599 A1 | 9/2021 | Sharovar | |
| 2021/0311634 A1 | 10/2021 | Chang et al. | |
| 2021/0382828 A1* | 12/2021 | Li | G06F 12/1009 |
| 2022/0076717 A1 | 3/2022 | Mathew et al. | |
| 2022/0121398 A1* | 4/2022 | Nale | G06F 3/0659 |
| 2022/0164251 A1* | 5/2022 | He | G06F 11/1048 |
| 2022/0164297 A1* | 5/2022 | Sity | G06F 12/1458 |
| 2022/0206855 A1* | 6/2022 | Challapalle | G06F 9/30076 |
| 2022/0229575 A1* | 7/2022 | Chen | G06F 3/0647 |
| 2022/0253247 A1 | 8/2022 | Kim et al. | |
| 2022/0253248 A1 | 8/2022 | Yoon et al. | |
| 2022/0283719 A1* | 9/2022 | Eyerman | G06F 11/3409 |
| 2022/0292033 A1 | 9/2022 | Yu et al. | |
| 2022/0374166 A1 | 11/2022 | La Fratta et al. | |
| 2023/0115296 A1 | 4/2023 | Jaser et al. | |
| 2023/0205705 A1 | 6/2023 | Poremba et al. | |
| 2023/0205706 A1* | 6/2023 | Madan | G06F 12/1009 |
| | | | 711/206 |
| 2023/0409238 A1 | 12/2023 | Aga et al. | |
| 2024/0004585 A1* | 1/2024 | Ibrahim | G06F 3/0673 |
| 2024/0103763 A1* | 3/2024 | Islam | G06F 3/0673 |
| 2024/0160364 A1 | 5/2024 | Dutu et al. | |
| 2024/0168639 A1 | 5/2024 | Aga et al. | |
| 2024/0184702 A1* | 6/2024 | Gouldey | G06F 9/30018 |
| 2024/0220107 A1* | 7/2024 | Dutu | G06F 3/061 |
| 2024/0220127 A1 | 7/2024 | Lee et al. | |

OTHER PUBLICATIONS

U.S. Appl. No. 17/986,623, "Non-Final Office Action", U.S. Appl. No. 17/986,623, Feb. 14, 2024, 12 pages.

Aga, Shaizeen, et al., "Co-ML: a Case for Collaborative ML Acceleration using Near-data Processing", Proceedings of the International Symposium on Memory Systems [retrieved May 27, 2022]. Retrieved from the Internet <https://doi.org/10.1145/3357526.3357532>, Sep. 30, 2019, 12 pages.

Dutu, A, et al., "US Application as Filed", U.S. Appl. No. 17/986,623, filed Nov. 14, 2022, 37 pages.

Islam, Mahzabeen, et al., "US Application as Filed", U.S. Appl. No. 17/953,723, filed Sep. 27, 2022, 52 pages.

Madan, Niti, et al., "US Application as Filed", U.S. Appl. No. 17/855,109, filed Jun. 30, 2022, 44 pages.

Madan, Niti, et al., "US Application as Filed", U.S. Appl. No. 17/561,454, filed Dec. 23, 2021, 35 pages.

U.S. Appl. No. 17/953,723, "Restriction Requirement", U.S. Appl. No. 17/953,723, Feb. 20, 2024, 6 pages.

PCT/US2023/033820, "International Seach Report and Written Opinion", PCT Application No. PCT/US2023/033820, Jan. 18, 2024, 7 pages.

U.S. Appl. No. 17/561,454, "Final Office Action", U.S. Appl. No. 17/561,454, Apr. 12, 2023, 13 pages.

U.S. Appl. No. 17/561,454, "Non-Final Office Action", U.S. Appl. No. 17/561,454, Oct. 13, 2023, 11 pages.

U.S. Appl. No. 17/561,454, "Non-Final Office Action", U.S. Appl. No. 17/561,454, Oct. 19, 2022, 11 pages.

U.S. Appl. No. 18/090,916, "Notice of Allowance", U.S. Appl. No. 18/090,916, Jul. 23, 2024, 9 pages.

U.S. Appl. No. 17/953,723, "Corrected Notice of Allowability", U.S. Appl. No. 17/953,723, Nov. 1, 2024, 2 pages.

U.S. Appl. No. 17/953,723, "Corrected Notice of Allowability", U.S. Appl. No. 17/953,723, Dec. 10, 2024, 3 pages.

U.S. Appl. No. 17/953,723, "Notice of Allowance", U.S. Appl. No. 17/953,723, Oct. 22, 2024, 5 pages.

U.S. Appl. No. 17/954,784, "Notice of Allowance", U.S. Appl. No. 17/954,784, Sep. 24, 2024, 8 pages.

U.S. Appl. No. 17/986,623, "Notice of Allowance", U.S. Appl. No. 17/986,623, Sep. 24, 2024, 8 pages.

U.S. Appl. No. 18/090,916, "Supplemental Notice of Allowability", U.S. Appl. No. 18/090,916, Sep. 30, 2024, 4 pages.

"Corrected Notice of Allowability", U.S. Appl. No. 17/953,723, Jan. 13, 2025, 3 pages.

* cited by examiner

```
PIMLdOp Odd Row x Col 0 //Row buffer conflict
PIMLdOp Odd Row x Col 1 //Row buffer hit
.
.
.
PIMLdOp Odd Row x Col 15 //Row buffer hit
PIMSt Odd Row y Col 0 //Row buffer conflict
PIMSt Odd Row y Col 1 //Row buffer hit
.
.
.
PIMSt Odd Row y Col 15 //Row buffer hit
```

304

```
PIMLdOp Even Row x Col 0 //Row buffer conflict
PIMLdOp Even Row x Col 1 //Row buffer hit
.
.
.
PIMLdOp Even Row x Col 15 //Row buffer hit
PIMSt Even Row y Col 0 //Row buffer conflict
PIMSt Even Row y Col 1 //Row buffer hit
.
.
.
PIMSt Even Row y Col 15 //Row buffer hit
```

AllBank Activate Row x — 402

PIMLdOp Odd Row x Col 0 //Row buffer hit — 404
PIMLdOp Odd Row x Col 1 //Row buffer hit
.
.
PIMLdOp Odd Row x Col 7 //Row buffer hit

PIMLdOp Even Row x Col 0 //Row buffer hit — 406
PIMLdOp Even Row x Col 1 //Row buffer hit
.
.
PIMLdOp Even Row x Col 7 //Row buffer hit

AllBank Precharge — 408
Allbank Activate Row y

PIMSt Odd Row y Col 0 //Row buffer hit — 410
PIMSt Odd Row y Col 1 //Row buffer hit
.
.
PIMSt Odd Row y Col 7 //Row buffer hit

PIMSt Even Row y Col 0 //Row buffer hit — 412
PIMSt Even Row y Col 1 //Row buffer hit
.
.
PIMSt Even Row y Col 7 //Row buffer hit

SCHEDULING PROCESSING-IN-MEMORY REQUESTS AND MEMORY REQUESTS

BACKGROUND

Computer technology is regularly advancing, resulting in faster computers. One such area of advancement is referred to as processing-in-memory (PIM), which refers to placing a processor closer to the memory cells, such as on the same chip as the memory cells. This allows computations to be performed closer to the computer's memory.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Computers use various types of memory, such as volatile memory (e.g., dynamic random access memory (DRAM)) and nonvolatile memory (e.g., nonvolatile random access memory (NVRAM)). A processing-in-memory (PIM) memory module includes multiple groups of memory banks as well as data processing capabilities (also referred to as one or more in-memory processors), such as an arithmetic logic unit (ALU) and one or more registers. The PIM memory module supports both PIM requests (also referred to as PIM commands) as well as memory requests (also referred to as memory commands). PIM requests refer to operations on data stored in the memory module that are performed by an in-memory processor in the PIM memory module. Memory requests refer to conventional operations (e.g., memory load and store operations) that originate from an external processor (e.g., a host central processing unit (CPU)) to read data from and write data to the memory module.

In one or more implementations, a memory controller coupled to the memory module receives both PIM requests and memory requests from a host (e.g., a host CPU). The memory controller issues PIM requests to one group of memory banks and concurrently issues memory requests to one or more other groups of memory banks. Accordingly, memory requests are performed on groups of memory banks that would otherwise be idle while PIM requests are performed on the one group of memory banks. This improves the performance of the memory module and memory controller because the PIM requests and memory requests are performed concurrently.

Additionally or alternatively, a memory controller coupled to the memory module takes various actions when switching between operating in a PIM mode and a non-processing-in-memory (non-PIM) mode. For example, when switching from operating in the non-PIM mode to operating in the PIM mode, the memory controller delays closing one or more rows in one or more groups of memory banks that are idle while at least one PIM request is performed on another one or more groups of memory banks of the memory block. This reduces or hides overhead when switching from the non-PIM mode to the PIM mode because the memory controller need not wait for all rows to be closed before issuing PIM requests to the associated groups of memory banks. By way of another example, when switching from operating in the PIM mode to operating in the non-PIM mode, while a last one or more PIM requests are being performed, one or more rows in the one or more groups of memory banks that are idle are closed and a row targeted by a next memory request to be executed in the non-processing-in-memory mode is opened. This reduces or hides overhead when switching from the PIM mode to the non-PIM mode because the closing and opening of the rows is performed concurrently with the last one or more PIM requests being executed.

In some aspects, the techniques described herein relate to a method including: identifying one or more groups of memory banks of a processing-in-memory block that are idle while one or more processing-in-memory requests are being performed on the processing-in-memory block, and issuing one or more memory requests on the one or more groups of memory banks that are idle while the one or more processing-in-memory requests are being performed on the processing-in-memory block.

In some aspects, the techniques described herein relate to a method, further including: determining a length of a processing-in-memory sequence that includes the one or more processing-in-memory requests, and issuing, based at least in part on the length, one or more memory requests to the one or more groups of memory banks that are idle.

In some aspects, the techniques described herein relate to a method, further including: determining that the one or more memory requests are performance critical or high-priority, and issuing, in response to determining that the one or more memory requests are performance critical or high-priority, the one or more memory requests to the one or more groups of memory banks that are idle.

In some aspects, the techniques described herein relate to a method, further including: determining that memory command latency restrictions allow for higher command bandwidth when processing-in-memory requests and memory requests are interleaved than when processing-in-memory requests alone are issued, and issuing, in response to determining that memory command latency restrictions allow for higher command bandwidth when processing-in-memory requests and memory requests are interleaved than when processing-in-memory requests alone are issued, the one or more memory requests to the one or more groups of memory banks that are idle.

In some aspects, the techniques described herein relate to a method, further including: determining that the one or more processing-in-memory requests are unable to fully utilize a memory command bus, and issuing, in response to determining that the one or more processing-in-memory requests are unable to fully utilize a memory command bus, the one or more memory requests to the one or more groups of memory banks that are idle.

In some aspects, the techniques described herein relate to a method, further including: determining that the one or more processing-in-memory requests will result in a first number of row buffer conflicts and a second number of row buffer hits, and issuing as the one or more memory requests, in response to determining that the one or more processing-in-memory requests will result in the first number of row buffer conflicts and the second number of row buffer hits, no more than the first number of memory requests that result in row buffer conflicts in the one or more groups of memory banks that are idle, and no more than the second number of memory requests that result in row buffer hits in the one or more groups of memory banks that are idle.

In some aspects, the techniques described herein relate to a method, further including: determining to switch from a processing-in-memory mode to a non-processing-in-memory mode, and while a last one or more processing-in-memory requests are being performed, closing one or more rows in the one or more groups of memory banks that are idle and opening a row targeted by a next memory request to be executed in the non-processing-in-memory mode.

In some aspects, the techniques described herein relate to a method, further including: determining to switch from a non-processing-in-memory mode to a processing-in-memory mode, and delaying closing one or more rows in the one or more groups of memory banks that are idle while at least one processing-in-memory request is performed on another one or more groups of memory banks of the memory block.

In some aspects, the techniques described herein relate to a method, wherein the method is implemented in memory controller coupled to the processing-in-memory block.

In some aspects, the techniques described herein relate to a system including: a scheduling module to identify one or more groups of memory banks of a processing-in-memory block that are idle while one or more processing-in-memory requests are being performed on the memory block, and an arbiter to issue one or more memory requests to the one or more groups of memory banks that are idle while the one or more processing-in-memory requests are being performed on the processing-in-memory block In some aspects, the techniques described herein relate to a system, wherein the scheduling module is further to determine a length of a processing-in-memory sequence that includes the one or more processing-in-memory requests, and the arbiter is further to issue, based at least in part on the length, one or more memory requests to the one or more groups of memory banks that are idle.

In some aspects, the techniques described herein relate to a system, wherein the scheduling module is further to determine that the one or more memory requests are performance critical or high-priority, and the arbiter is further to issue, in response to the one or more memory requests being performance critical or high-priority, the one or more memory requests to the one or more groups of memory banks that are idle.

In some aspects, the techniques described herein relate to a system, wherein the scheduling module is further to determine that memory command latency restrictions allow for higher command bandwidth when processing-in-memory requests and memory requests are interleaved than when processing-in-memory requests alone are issued, and the arbiter is further to issue, in response to the memory command latency restrictions allowing for higher command bandwidth when processing-in-memory requests and memory requests are interleaved than when processing-in-memory requests alone are issued, the one or more memory requests to the one or more groups of memory banks that are idle.

In some aspects, the techniques described herein relate to a system, wherein the scheduling module is further to determine that the one or more processing-in-memory requests are unable to fully utilize a memory command bus, and the arbiter is further to issue, in response to the one or more processing-in-memory requests being unable to fully utilize a memory command bus, the one or more memory requests to the one or more groups of memory banks that are idle.

In some aspects, the techniques described herein relate to a system, wherein the scheduling module is further to determine that the one or more processing-in-memory requests will result in a first number of row buffer conflicts and a second number of row buffer hits, and the arbiter is further to issue as the one or more memory requests, in response to the one or more processing-in-memory requests will result in the first number of row buffer conflicts and the second number of row buffer hits, no more than the first number of memory requests that result in row buffer conflicts in the one or more groups of memory banks that are idle, and no more than the second number of memory requests that result in row buffer hits in the one or more groups of memory banks that are idle.

In some aspects, the techniques described herein relate to a system, wherein the scheduling module is further to determine to switch from a processing-in-memory mode to a non-processing-in-memory mode, and the arbiter is further to, while a last one or more processing-in-memory requests are being performed, close one or more rows in the one or more groups of memory banks that are idle and open a row targeted by a next memory request to be executed in the non-processing-in-memory mode.

In some aspects, the techniques described herein relate to a system, wherein the scheduling module is further to determine to switch from a non-processing-in-memory mode to a processing-in-memory mode, and the arbiter is further to delay closing one or more rows in the one or more groups of memory banks that are idle while at least one processing-in-memory request is performed on another one or more groups of memory banks of the memory block.

In some aspects, the techniques described herein relate to a system, wherein the system includes a memory controller.

In some aspects, the techniques described herein relate to a method including: determining to switch from a processing-in-memory mode to a non-processing-in-memory mode, and while a last one or more processing-in-memory requests are being performed, closing one or more rows in one or more groups of memory banks that are idle and opening a row targeted by a next memory request to be executed in the non-processing-in-memory mode.

In some aspects, the techniques described herein relate to a method, further including: determining to switch from the non-processing-in-memory mode to the processing-in-memory mode, and delaying closing one or more rows in the one or more groups of memory banks that are idle while at least one processing-in-memory request is performed on another one or more groups of memory banks.

Figure 1:
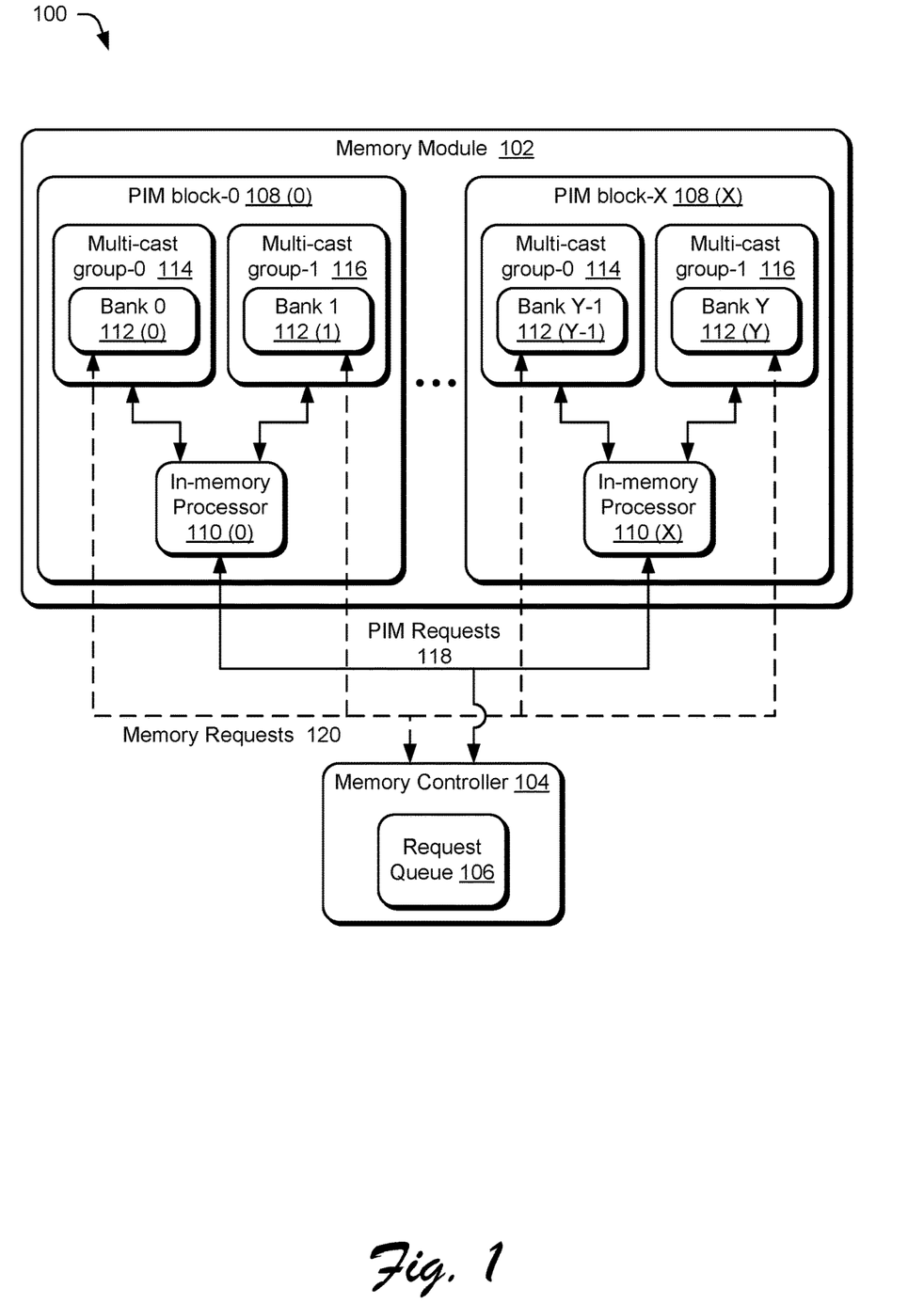
FIG. 1 is an illustration of a non-limiting example memory system that is operable to employ the scheduling processing-in-memory requests and memory requests described herein.

FIG. 1 is an illustration of a non-limiting example memory system 100 that is operable to employ the scheduling processing-in-memory requests and memory requests described herein. The memory system 100 includes a memory module 102 and a memory controller 104. The memory module 102 includes any of a variety of different types of memory, such as volatile memory (e.g., dynamic random access memory (DRAM), double data rate (DDR) random access memory (RAM), high bandwidth memory (HBM), and so forth) or nonvolatile memory (e.g., nonvolatile random access memory (NVRAM)).

The memory controller 104 receives both PIM requests and memory requests from a host. The host is an issuer of memory requests, such as a CPU, a graphics processing unit (GPU), a parallel accelerated processor, and so forth. In one or more implementations, the memory controller 104 is included as part of the host. Additionally or alternatively, the memory controller 104 is separate from the host (e.g., the memory controller 104 is a separate chip or component).

The PIM requests and memory requests are stored in at least one request queue 106. In one or more implementations, PIM requests and memory requests are stored in separate queues, as discussed in more detail below. Additionally or alternatively, the PIM requests and memory requests are stored in a single queue.

The memory module 102 includes multiple (X+1) PIM blocks 108 (0), . . . , 108 (X), each of which includes an in-memory processor 110 (0), . . . , 110 (X). An in-memory processor 110 processes PIM requests received from the memory controller 104. In one or more implementations the memory controller 104 is an ALU and one or more registers. The one or more registers are, for example, a register file. The memory module 102 also includes multiple (Y+1) memory banks 112 (0), . . . , 112 (Y). The memory banks 112 (0), . . . , 112 (Y) are organized into two multi-cast groups (illustrated as multi-cast group 114 and multi-cast group 116) spread out among the PIM blocks 108 (0), . . . , 108 (X), with each PIM block 108 (0), . . . , 108 (X) including one memory bank from each multi-cast group 114 and 116. Accordingly, in the illustrated example, multi-cast group 114 is made up of the even memory banks and the multi-cast group 116 is made up of the odd memory banks. Although two groups of memory banks are illustrated in the memory module 102, it is to be appreciated that in other implementations more groups of memory banks are included. For example, in different implementations the memory module 102 includes three or more groups of memory banks.

The memory module 102 is made up of any number of memory banks. As an example, assume there are 16 memory banks (e.g., Y=15) and 8 PIM blocks (e.g., X=8). The even memory banks (e.g., 0, 2, 4, . . . , Y−1) are in multi-cast group 114 and the odd memory banks (e.g., 1, 3, 5, . . ., Y) are in multi-cast group 116.

The memory controller 104 issues PIM requests 118 to the memory module 102, each PIM request 118 targeting the same multi-cast group. For example, when memory controller 104 issues a PIM request 118 to multi-cast group 116, that same PIM request is sent to memory bank 112 (1), memory bank 112 (3), memory bank 112 (5), . . . , and memory bank 112 (Y). The PIM request is received by the in-memory processor 110 (0), . . . , 110 (X), which performs the requested operation(s). For example, the in-memory processors in each of the PIM blocks 108 (0), . . . , 108 (X) load data from the memory bank targeted by the PIM request 118, perform one or more operations on the data, and store the result in the memory bank targeted by the PIM requests 118.

In one or more implementations, the memory controller 104 issues PIM requests 118 to a single multi-cast group at a time. Accordingly, any memory banks not included in the multi-cast group targeted by a PIM request 118 are idle while the PIM request 118 is being performed. The techniques discussed herein leverage this idleness to perform one or more memory requests as discussed in more detail below.

The memory controller 104 also issues memory requests 120 to the memory module 102. These memory requests 120 are conventional operations (e.g., load and store operations) that originate from the host to read data from and write data to the memory module. Operations performed on data read by the memory requests 120 are performed by the host rather than by the in-memory processors 110. Accordingly, the memory requests are also referred to as requests that are not processed or are non-processing in the memory module.

The memory system 100 is implementable in any of a variety of different types of computing devices that include or use memory. For example, the memory system 100 is implementable in a smartphone or other wireless phone, a tablet or phablet computer, a notebook computer (e.g., netbook or ultrabook), a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IoT) device, an automotive computer, and so forth.

Figure 2:
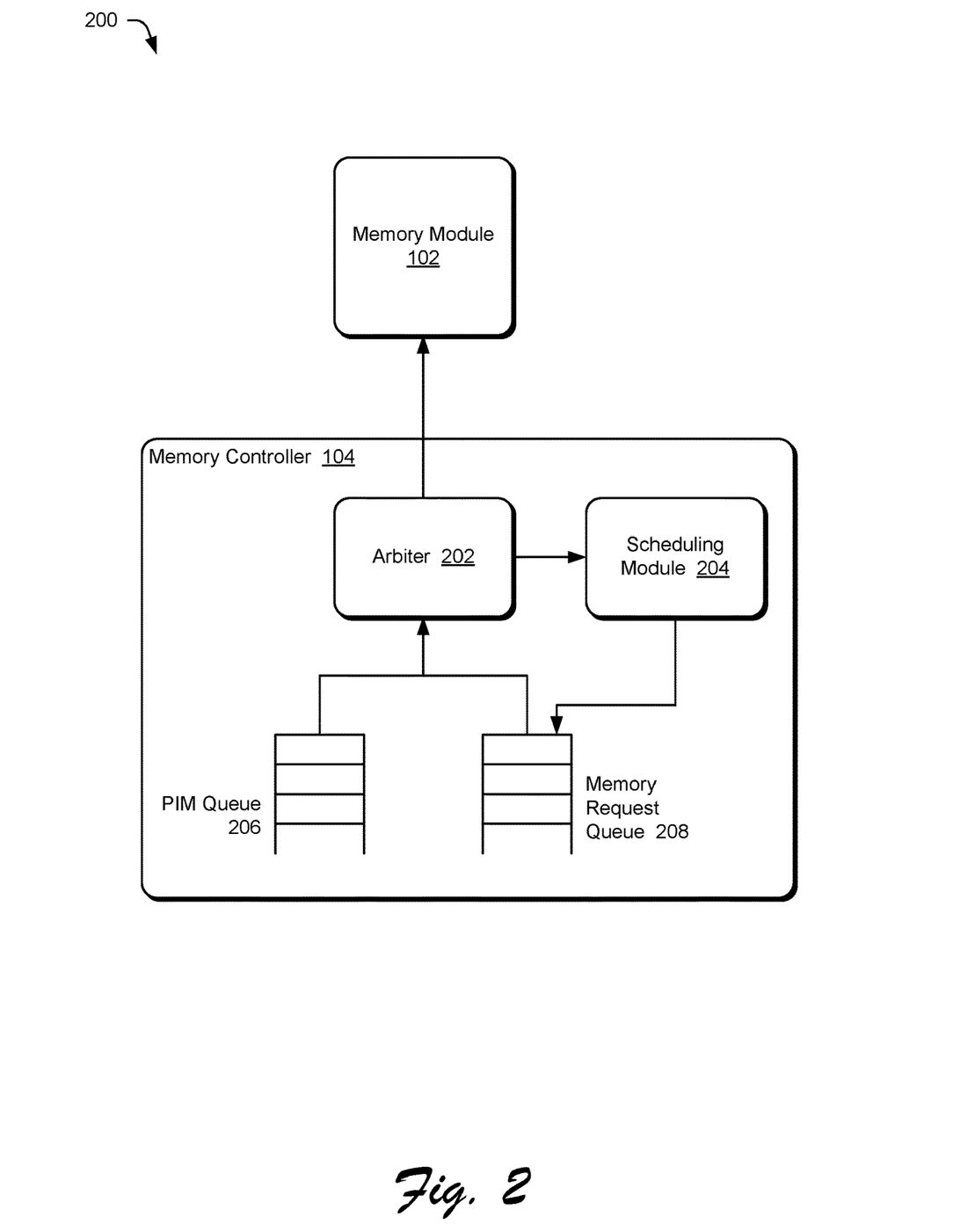
FIG. 2 illustrates an example of the architecture of the memory controller.

FIG. 2 illustrates an example 200 of the architecture of the memory controller 104. The memory controller 104 includes an arbiter 202, a scheduling module 204, a PIM queue 206, and a memory request queue 208. The PIM queue 206 stores PIM requests received from a host and the memory request queue 208 stores memory requests received from the host. Together the PIM queue 206 and the memory request queue 208 form the request queue 106 of FIG. 1.

The memory controller 104 is able to operate in a PIM mode or a non-PIM mode. In the PIM mode, the arbiter 202 sends PIM requests from PIM queue 206 to the memory module 102, and sends some memory requests from the memory request queue 208 to the memory module 102 in accordance with the techniques discussed herein. In the non-PIM mode, the arbiter 202 sends memory requests from the memory request queue 208 to the memory module 102.

The arbiter 202 uses any of various different factors to determine whether to operate in PIM mode or non-PIM mode. As an example, these factors include priorities of PIM requests and memory requests so that higher priority requests are sent to the memory module 102 prior to lower priority requests. By way of another example, these factors include how many PIM requests and how many memory requests have been sent to the memory module 102 so that neither PIM requests nor memory requests are starved off.

In one or more implementations, the factors used by the arbiter 202 in determining to switch from PIM mode to non-PIM mode include whether high priority memory requests are being issued and a number of memory requests in the memory request queue 208. By interleaving memory requests with PIM requests (e.g., executing memory requests on one or more idle memory bank groups), situations arise where the high priority memory requests are issued and the number of memory requests in the memory request queue 208 remains smaller, allowing the arbiter 202 to keep the memory controller 104 in PIM mode longer and improving performance of the memory controller 104 due to less switching overhead being expended switching between the PIM mode and the non-PIM mode.

The arbiter 202 notifies the scheduling module 204 when the memory controller 104 is operating in PIM mode and the scheduling module 204 selects memory requests from the memory request queue 208 to send to the memory module 102 while the memory controller 104 is operating in PIM mode. The scheduling module 204 identifies one or more groups of memory banks that are idle and determines one or more memory requests that the arbiter 202 is to issue to those one or more groups. The scheduling module 204 determines the one or more groups of memory banks that are idle in any of a variety of manners, such as receiving an indication from the arbiter 202 of a group of memory banks to which PIM requests have been issued.

The scheduling module 204 determines whether to send memory requests to the memory module 102 while the memory controller 104 is operating in PIM mode, and which memory requests to send to the memory module 102. In one or more implementations, the scheduling module 204 takes into account, while the memory controller 104 is operating in PIM mode, the set of one or more memory banks that are not currently being targeted by a PIM request, and the length of the PIM sequence (e.g., how many PIM requests) being issued to the PIM memory bank set targeted by the PIM request as discussed in more detail below.

The scheduling module 204 determines whether to send memory requests to the memory module 102 (e.g., perform memory requests) while the memory controller 104 is operating in PIM mode in any of a variety of manners. In one or more implementations, the scheduling module 204 identifies times to perform memory requests would be beneficial to the performance of the memory system 100. For example, the scheduling module 204 determines to perform memory requests in response to there being memory requests in the memory request queue 208 that are performance-critical or high-priority (e.g., such that issuing them is desirable even if it impacts PIM performance, such as by contending with PIM commands for memory command bus bandwidth in the memory module 102 and between the memory module 102 and the memory controller 104). The priority of memory requests, or whether a memory request is performance-critical, is determined in any of a variety of different manners. As an example, the priority or performance-critical is identified by the host (e.g., the memory request as received from the host indicates the priority of the memory request or whether the memory request is performance-critical). As another example, the memory controller 104 (e.g., scheduling module 204) sets the priority of a memory request (e.g., if a memory request has been in the memory request queue 208 for greater than a threshold amount of time, the memory controller 104 sets the priority of the memory request to a high or higher priority).

By way of another example, the scheduling module 204 determines to perform memory requests in response to memory command latency restrictions allowing for higher command bandwidth when PIM commands and memory request commands are interleaved than when PIM commands alone are issued. For example, if the latency required between two PIM commands to the same PIM block is greater than the latency required between a PIM command and a memory request command to a memory bank not involved in the PIM computation, then overall memory command throughput is increased by interleaving PIM and memory request commands.

By way of another example, the scheduling module 204 determines to issue memory requests in response to the PIM command sequence (the PIM requests) being unable to fully utilize the command bus (e.g., between the memory controller 104 and the memory module 102 and within the memory module 102). For example, if a PIM request needs to activate a new row in DRAM, the arbiter 202 waits for a period of time before issuing further requests. Memory request commands are able to be issued to banks not being operated on by the PIM command during this time without affecting PIM performance. Similarly, after a row has been opened and while PIM column commands are being executed, the arbiter 202 is able to issue row activation commands for memory request commands on the row command bus without impacting PIM performance.

The scheduling module 204 determines which, if any, memory requests to send to the memory module 102 while the memory controller 104 is operating in PIM mode. In one or more implementations, the scheduling module 204 determines how many memory requests to issue based on the number of PIM requests to be executed. The scheduling module 204 determines the number of memory requests so that the latency of executing the memory requests does not exceed the PIM execution latency. The latency of executing a PIM request and a memory request is known (or is readily estimated) by the memory controller 104, and in one or more implementations is based at least in part on the row buffer conflicts and row buffer hits for the PIM requests.

A memory bank (e.g., of DRAM) is organized as a grid having multiple rows and columns. The memory bank is able to have a single row open at any given time. If a request targets a memory bank that is already open it is referred to as a row buffer hit. However, if a request targets a memory bank that is not already open it is referred to as a row buffer conflict. In the event of a row buffer conflict, the memory controller 104 closes the currently open row (e.g., issues a command to precharge or deactivate the currently open row) and opens the targeted row (e.g., issues a command to activate the targeted row). In the event of a row buffer hit, the targeted row is already open so no closing of one row and opening of another row need be performed. By tracking the number of row buffer conflicts for scheduled PIM requests for a group of memory banks, as well as a number of scheduled PIM requests that have row buffer hits, the scheduling module 204 determines how many memory requests to issue to the one or more groups of idle memory banks.

Figure 3:
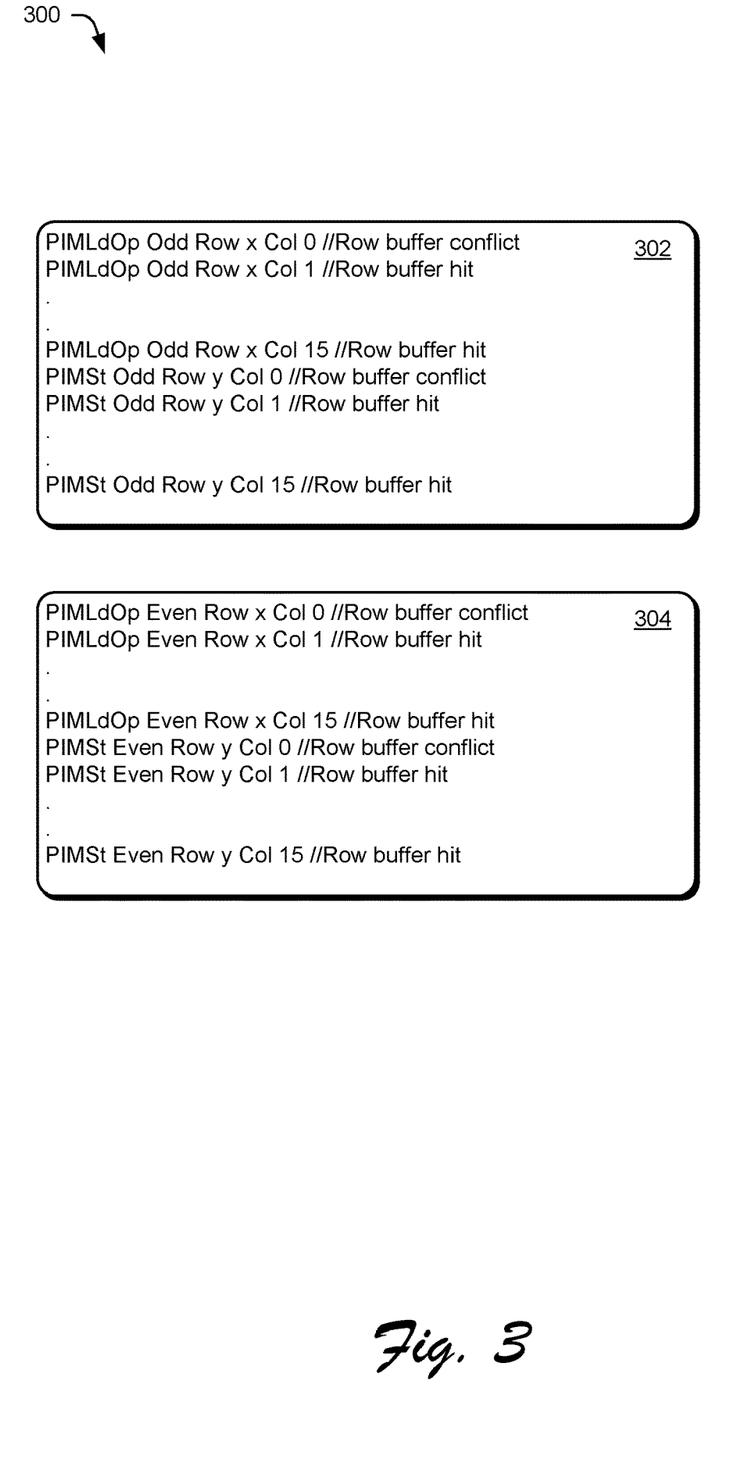
FIG. 3 illustrates an example of PIM requests.

FIG. 3 illustrates an example 300 of PIM requests. The example 300 assumes that the memory module 102 includes two groups of memory banks referred to as an even group and an odd group. The example 300 also assumes a register file size of 16 so only 16 columns are read. At 302, a sequence of multiple PIM load operations and PIM store operations are shown, which load data into the in-memory processors 110 and store data resulting from processing by the in-memory processors 110. First, a sequence of multiple PIM load operations (multiple PIMLdOp) to row x of the odd group of memory banks is shown, each PIM load operation being an operation to load the data at a column of row x into the in-memory processors 110 and perform an arithmetic operation on the data as one of the operands. The row x was closed when the first PIM load operation of the sequence was issued, which results in a row buffer conflict causing the memory controller 104 to close the currently open row and open row x.

After the last PIM load operation (to row x and column 15), a sequence of multiple PIM store (PIMSt) operations to row y of the odd group of memory banks is shown. Each PIM store operation is an operation to store the data resulting from the processing performed by the in-memory processors 110 in a column of row y. The row y was closed when the first PIM store operation of the sequence was issued, which results in a row buffer conflict causing the memory controller 104 to close the currently open row and open row y.

By tracking the number of row buffer conflicts for the PIM store and PIM load operations for the odd group of memory banks, as well as a number of the PIM store and PIM load operations that have row buffer hits, the scheduling module 204 determines how many memory requests to issue to the idle group of memory banks (which at 302 is the even group of memory banks). For example, based on the operations at 302, PIM operations on the odd memory banks will result in two row buffer conflicts each followed by 15 requests that are row buffer hits. This implies that up to two new rows are openable for memory requests in each of the even group of memory banks and up to 15 requests are issuable to each open row or any combination of row and column commands as long as the latency of executing memory requests does not exceed PIM execution latency. This ensures that no additional performance overheads are introduced by parallelizing memory requests during the idle period of the even group of memory banks.

At 304, a sequence of multiple PIM load operations and PIM store operations are shown, which load data into the in-memory processors 110 and store data resulting from processing by the in-memory processors 110. First, a sequence of multiple PIM load operations (multiple PIML-dOp) to row x of the even group of memory banks is shown, each PIM load operation being an operation to load the data at a column of row x into the in-memory processors 110 and perform an arithmetic operation on the data as one of the operands. The row x was closed when the first PIM load operation of the sequence was issued, which results in a row buffer conflict causing the memory controller 104 to close the currently open row and open row x.

After the last PIM load operation (to row x and column 15), a sequence of multiple PIM store (PIMSt) operations to row y of the even group of memory banks is shown. Each PIM store operation is an operation to store the data resulting from the processing performed by the in-memory processors 110 in a column of row y. The row y was closed when the first PIM store operation of the sequence was issued, which results in a row buffer conflict causing the memory controller 104 to close the currently open row and open row y.

By tracking the number of row buffer conflicts for the PIM store and PIM load operations for the even group of memory banks, as well as a number of the PIM store and PIM load operations that have row buffer hits, the scheduling module 204 determines how many memory requests to issue to the idle group of memory banks (which at 304 is the odd group of memory banks). For example, based on the operations at 302, PIM operations on the even memory banks have two row buffer conflicts each followed by 15 requests that are row buffer hits. This implies that up to two new rows are openable for memory requests in each of the odd group of memory banks and up to 15 requests are issuable to each open row or any combination of row and column commands as long as the latency of executing memory requests does not exceed PIM execution latency. This ensures that no additional performance overheads are introduced by parallelizing memory requests during the idle period of the odd group of memory banks.

In one or more implementations, the scheduling module 204 determines which, if any, memory requests to send to the memory module 102 while the memory controller 104 is operating in PIM mode by selecting memory requests that have greater than a threshold priority and target the idle memory group (e.g., the even group of memory banks at 302 or the odd group of memory banks at 304). For example, the scheduling module 204 selects memory requests with a high priority or urgent priority that target the idle memory group but does not select memory requests with lower priorities (e.g., low priority or medium priority). This helps address the fairness and quality of service for memory requests that get stalled during PIM mode without disrupting the row locality of PIM requests in the active set of memory banks. In one or more implementations, the scheduling module 204 views these memory requests that have greater than the threshold priority as a priority escalation issue and issues multiple memory requests without regard for whether the latency of executing memory requests exceeds PIM execution latency. Accordingly, situations arise where issuing these memory requests that have greater than the threshold priority slows down issuing of PIM requests.

In one or more implementations, the scheduling module 204 determines which, if any, memory requests to send to the memory module 102 while the memory controller 104 is operating in PIM mode by issuing memory requests opportunistically in a way that does not significantly impact PIM performance. In order to do this, the scheduling module 204 identifies when there is a sequence of PIM requests to the same group of memory banks (e.g., odd or even banks). This is determined, for example, by inspecting the corresponding bit(s) in the address field of the PIM queue 206, or based on a heuristic prediction mechanism. The length of this sequence determines how many memory requests the arbiter 202 issues to idle memory banks without unfairly impacting PIM performance.

In one or more implementations, the scheduling module 204 uses a first sequence length threshold that is to be satisfied in order to issue a memory request that is a row buffer conflict (and thus requires a row activation), and a second sequence length threshold that is to be satisfied in order to issue a memory request that is a row buffer hit (and thus does not require a row activation). The first sequence length threshold is longer than the second sequence length threshold due to the additional time needed for the row activation.

In one or more implementations, if multiple memory requests are eligible to be issued, the scheduling module 204 prioritizes the memory requests based on any of various factors. In one example, the scheduling module 204 prioritizes the memory requests based on request priority or quality of service (e.g., higher priority requests are given a higher priority than lower priority requests, requests indicating a higher quality of service are given a higher priority than requests not indicating a higher quality of service). By way of another example, the scheduling module 204 prioritizes the memory requests based on request type (e.g., read requests are prioritized over write requests). By way of another example, the scheduling module 204 prioritizes the memory requests based on the availability of the associated bus(es) (e.g., row activate commands are issued for memory request row conflicts while PIM column commands are issued, column commands for memory request row hits are issued while waiting on row activation for a PIM request).

Returning to FIG. 2, in one or more implementations the memory controller 104 takes one or more of various actions to effectively hide or reduce switching overhead when the arbiter 202 switches from PIM mode to non-PIM mode. As the arbiter 202 manages switching between PIM mode and non-PIM mode, the arbiter 202 knows when switching from the PIM mode to the non-PIM mode is imminent (e.g., fewer than a threshold number of PIM requests are to be issued). When the last one or more PIM requests to be executed prior to switching to non-PIM mode are being executed, instead of issuing a memory request to an idle group of memory banks, the arbiter 202 closes any currently open rows (e.g., issues a command to precharge or deactivate any currently open rows) in any of the idle groups of memory banks, and opens the row (e.g., issues a command to activate the row) in an idle group of memory banks targeted by the next memory request to be issued. The next memory request to be issued is determined in any of various manners, such as by the scheduling module 204 as discussed above or by other criteria used by the arbiter 202. Once the one or more memory banks used by the last one or more PIM requests being executed are done being executed, the arbiter 202 closes any currently open rows (e.g., issues a command to precharge or deactivate any currently open rows) in the group of memory banks that the last one or more PIM requests were accessing.

This closing of currently open rows and opening of rows in an idle group of memory banks helps hide the switching overhead when switching from PIM mode to non-PIM mode for at least one half of the memory banks because it is done concurrently with the last one or more PIM requests being executed.

Additionally or alternatively, the memory controller 104 takes one or more of various actions to effectively hide or reduce switching overhead when the arbiter 202 switches from non-PIM mode to PIM mode.

If only a subset of the groups of memory banks are accessed by the first one or more PIM commands, closing rows in other groups of memory banks is delayed. For example, referring to example 300 of FIG. 3, when switching to execute the PIM requests at 302, all odd rows are closed immediately, but even rows continue to service memory requests for a longer period of time. E.g., closing the row for even banks is delayed up to a period of time equal to the time it takes to issue the odd PIM requests without delaying issuing even PIM requests. In such situations, when nearing the entry to PIM mode (e.g., fewer than a threshold number of memory requests are to be issued or complete execution until switching to PIM mode), the arbiter 202 optionally prioritizes draining (e.g., issuing) pending memory requests to odd banks prior to switching to PIM mode, and continues to drain pending memory requests to even banks in parallel with issuing an initial set of PIM commands to odd banks. Accordingly, when switching from non-PIM mode to PIM mode, the arbiter 202 need not wait for all rows to be closed before issuing PIM requests to the associated groups of memory banks.

In one or more implementations, when in PIM mode the arbiter 202 initially issues all-bank row commands so there will be no row buffer conflicts. Such an implementation is usable, for example, in situations where the register file is shared by two banks simultaneously.

Figure 4:
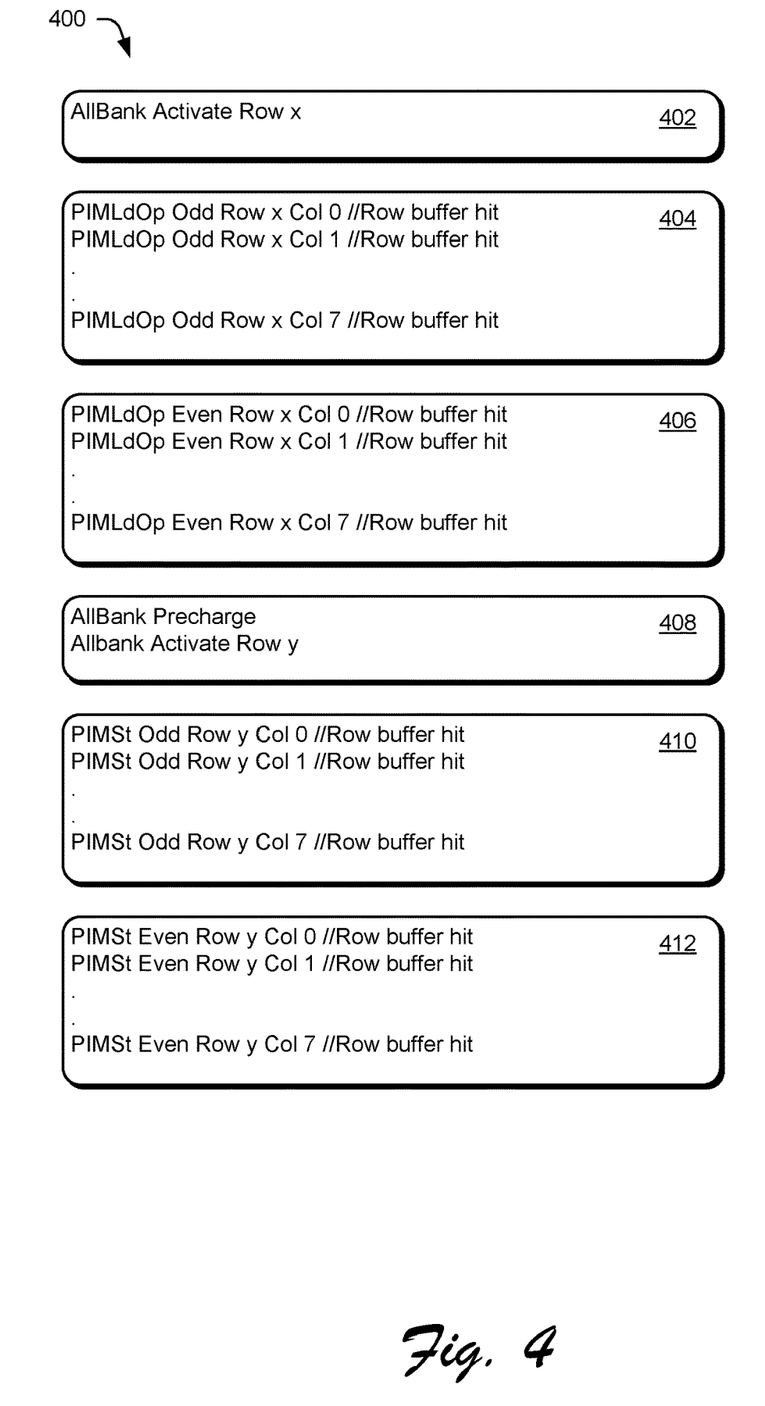
FIG. 4 illustrates another example of PIM requests.

FIG. 4 illustrates another example 400 of PIM requests. The example 400 assumes that the memory module 102 includes two groups of memory banks referred to as an even group and an odd group, analogous to the example 300 of FIG. 3 discussed above. However, the example 400 shows an implementation where the register file is shared by two banks simultaneously (e.g., eight registers are used at a time by even banks and the other eight registers are used by odd banks).

At 402, all-bank row commands to open (e.g., activate) the target row (row x) are issued by the arbiter 202. These all-bank row commands are to open the target row for both the odd group of memory banks and the even group of memory banks.

At 404, a sequence of multiple PIM load operations is shown, which load data into the in-memory processors 110 and perform an arithmetic operation on the data as one of the operands. A sequence of multiple PIM load operations (multiple PIMLdOp) to row x of the odd group of memory banks is shown, each PIM load operation being an operation to load the data at a column of row x into the in-memory processors 110 and perform an arithmetic operation on the data as one of the operands.

At 406, a sequence of multiple PIM load operations is shown, which load data into the in-memory processors 110. A sequence of multiple PIM load operations (multiple PIMLdOp) to row x of the even group of memory banks is shown, each PIM load operation being an operation to load the data at a column of row x into the in-memory processors 110 and perform an arithmetic operation on the data as one of the operands.

At 408, all-bank row commands to close (e.g., precharge or deactivate) row x and open (e.g., activate) the target row (row y) are issued by the arbiter 202. These all-bank row commands are to close the row that was targeted by the PIM load operations (row x) for both the odd group of memory banks and the even group of memory banks, and to open the target row (row y) for both the odd group of memory banks and the even group of memory banks.

At 410, a sequence of multiple PIM store (PIMSt) operations to row y of the odd group of memory banks is shown. Each PIM store operation is an operation to store the data resulting from the processing performed by the in-memory processors 110 in a column of row y.

At 412, a sequence of multiple PIM store (PIMSt) operations to row y of the even group of memory banks is shown. Each PIM store operation is an operation to store the data resulting from the processing performed by the in-memory processors 110 in a column of row y.

In the example 400, parallel execution of PIM requests and memory requests is supported for odd banks when even banks are executing PIM requests (e.g., at 406 and at 412). Parallel execution of PIM requests and memory requests is not supported for even banks when odd banks are executing PIM requests (e.g., at 404 and at 410). This avoids an additional row buffer conflict as the same row is opened in both even and odd banks at the start. An exception to this is that for memory requests that are issuable to even banks are the ones that are page-hits on the already open row in even banks. The scheduling module 204 optionally takes these rows into account in opportunistically issuing memory requests in parallel with execution of PIM requests.

Although discussed herein with reference to groups of memory banks, it is to be appreciated that the techniques discussed herein are not limited to memory banks and are applicable to various other granularities of memory or memory blocks.

Additionally, although discussed herein with reference to PIM requests and memory requests, it is to be appreciated that the techniques discussed herein are applicable to other situations. For example, situations where the memory controller is arbitrating between two different types of requests, one type of request being a single-element request (e.g., a memory request) and the other type of request being a multiple-element request (e.g., a PIM request).

Furthermore, although discussions herein refer to all-bank activate and precharge commands. Additionally or alternatively, all-even-bank and all-odd-bank activate and precharge commands are issued to all even and odd banks, respectively. This decreases the cost of scheduling memory requests commands to idle groups of memory banks.

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 1-4.

Figure 5:
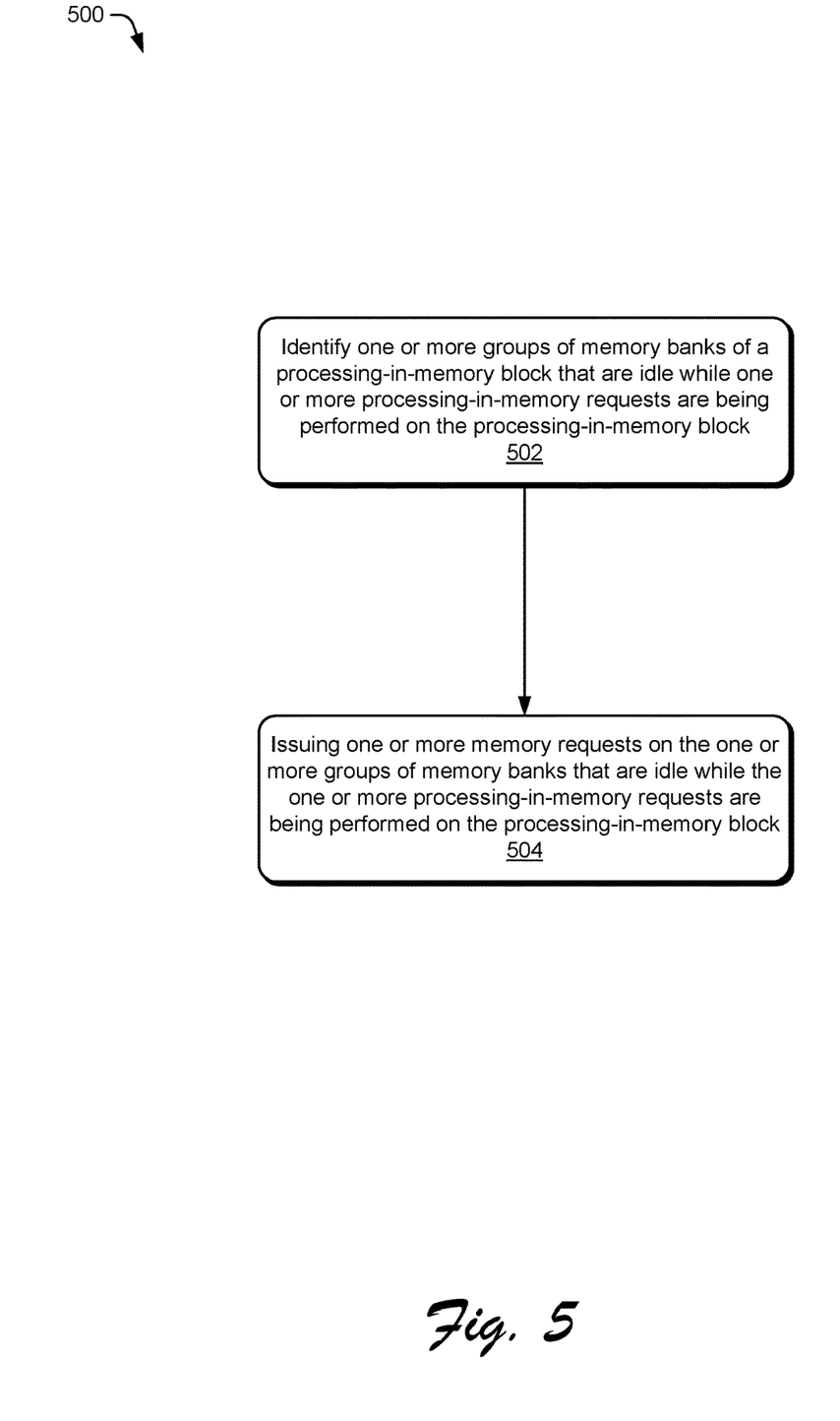
FIG. 5 is a flow diagram depicting a procedure in an example implementation of scheduling processing-in-memory requests and memory requests.

FIG. 5 is a flow diagram 500 depicting a procedure in an example implementation of scheduling processing-in-memory requests and memory requests. The flow diagram 500 is performed by a memory controller such as a memory controller 104 of FIG. 1 or FIG. 2.

In this example, one or more groups of memory banks of a processing-in-memory block that are idle while one or more processing-in-memory requests are being performed on the processing-in-memory block are identified (block 502). In one or more implementations, the one or more processing-in-memory requests are performed on one group of memory banks, leaving one or more other groups of memory banks idle.

One or more memory requests are issued on the one or more groups of memory banks that are idle while the one or more processing-in-memory requests are being performed on the processing-in-memory block (block 504). Accordingly, processing-in-memory requests and memory requests are performed concurrently or in parallel.

Figure 6:
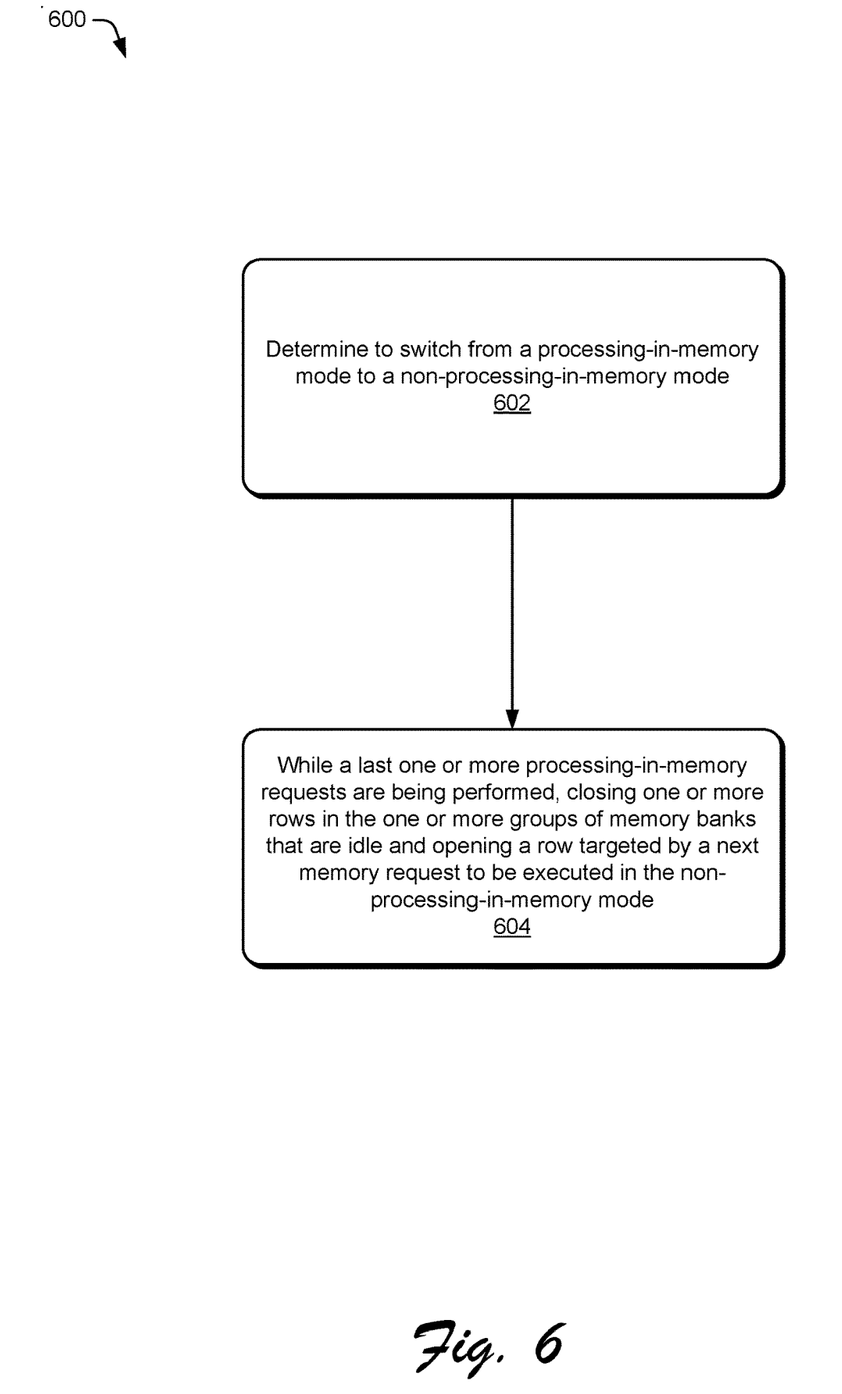
FIG. 6 is another flow diagram depicting a procedure in an example implementation of scheduling processing-in-memory requests and memory requests.

FIG. 6 is a flow diagram 600 depicting a procedure in an example implementation of scheduling processing-in-memory requests and memory requests. The flow diagram 600 is performed by a memory controller such as a memory controller 104 of FIG. 1 or FIG. 2.

In this example, a determination to switch from a processing-in-memory mode to a non-processing-in-memory mode is made (block 602).

While a last one or more processing-in-memory requests are being performed, one or more rows in the one or more groups of memory banks that are idle are closed and a row targeted by a next memory request to be executed in the non-processing-in-memory mode is opened (block 604).

Figure 7:
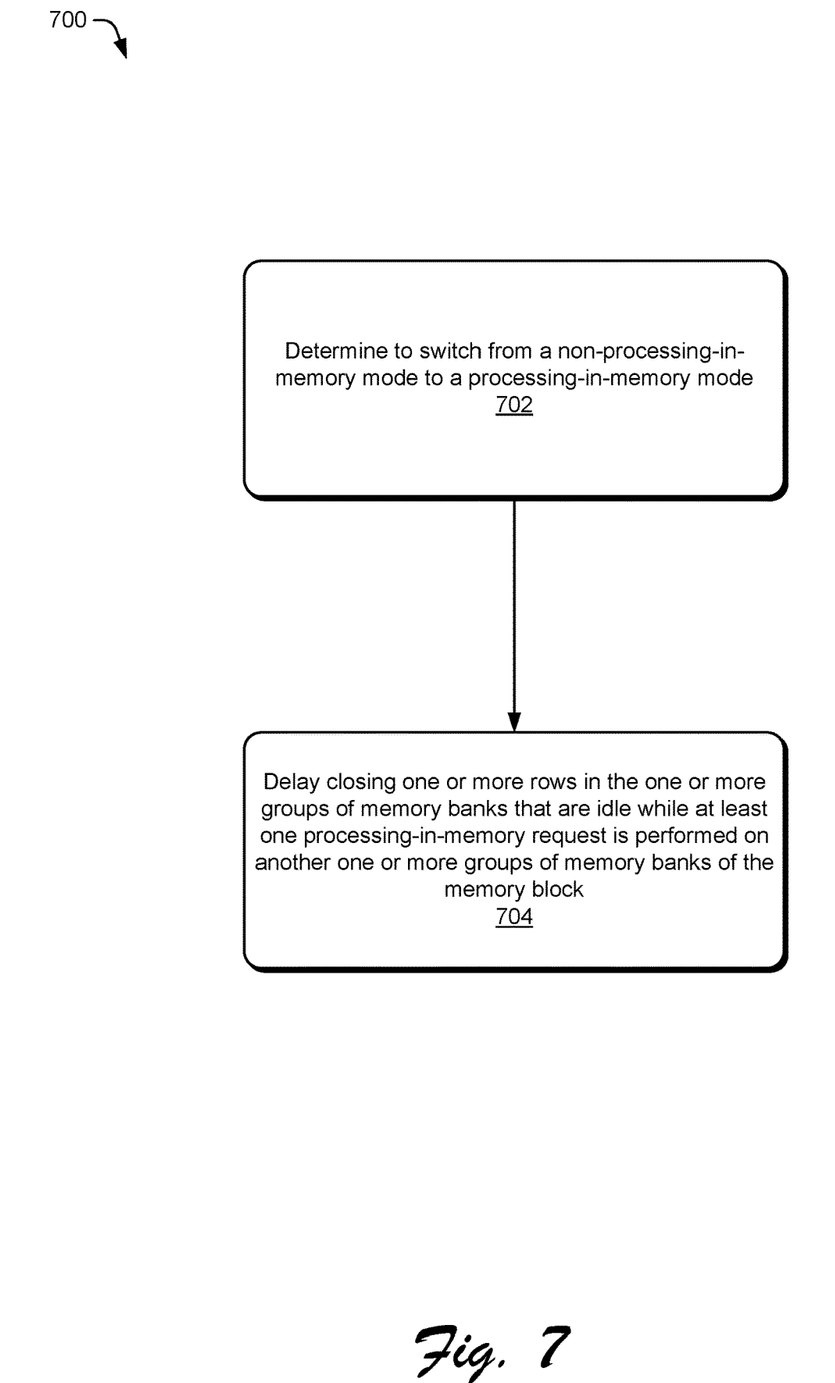
FIG. 7 is another flow diagram depicting a procedure in an example implementation of scheduling processing-in-memory requests and memory requests.

FIG. 7 is a flow diagram 700 depicting a procedure in an example implementation of scheduling processing-in-memory requests and memory requests. The flow diagram 700 is performed by a memory controller such as a memory controller 104 of FIG. 1 or FIG. 2.

In this example, a determination to switch from a non-processing-in-memory mode to a processing-in-memory mode is made (block 702).

Closing of one or more rows in the one or more groups of memory banks that are idle is delayed while at least one processing-in-memory request is performed on another one or more groups of memory banks of the memory block (block 704).

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the arbiter 202, and the scheduling module 204) are implemented in any of a variety of different manners such as hardware circuitry, software executing or firmware executing on a programmable processor, or any combination of two or more of hardware, software, and firmware. The methods provided are optionally implemented as part of any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
switching into a processing-in-memory mode which interleaves processing-in-memory requests and memory requests; and
in the processing-in-memory mode:
identifying one or more groups of memory banks of a processing-in-memory block that are idle while one or more processing-in-memory requests are being performed on the processing-in-memory block; and
issuing one or more memory requests on the one or more groups of memory banks that are idle while the one or more processing-in-memory requests are being performed on the processing-in-memory block.

2. The method of claim 1, further comprising:
determining a length of a processing-in-memory sequence that includes the one or more processing-in-memory requests; and
issuing, based at least in part on the length, one or more memory requests to the one or more groups of memory banks that are idle.

3. The method of claim 1, wherein the switching into the processing-in-memory mode is in response to determining that the one or more memory requests have a priority level above a predetermined threshold.

4. The method of claim 1, wherein the switching into the processing-in-memory mode is in response to determining that memory command latency restrictions allow for higher command bandwidth when processing-in-memory requests and memory requests are interleaved than when processing-in-memory requests alone are issued.

5. The method of claim 1, wherein the switching into the processing-in-memory mode is in response to determining that the one or more processing-in-memory requests are unable to fully utilize a memory command bus.

6. The method of claim 1, wherein the switching into the processing-in-memory mode is in response to determining that the one or more processing-in-memory requests will result in a first number of row buffer conflicts and a second number of row buffer hits, no more than the first number of memory requests that result in row buffer conflicts in the one or more groups of memory banks that are idle, and no more than the second number of memory requests that result in row buffer hits in the one or more groups of memory banks that are idle.

7. The method of claim 1, further comprising:
determining to switch from the processing-in-memory mode to a non-processing-in-memory mode; and
while a last one or more processing-in-memory requests are being performed, closing one or more rows in the one or more groups of memory banks that are idle and opening a row targeted by a next memory request to be executed in the non-processing-in-memory mode.

8. The method of claim 7, further comprising:
determining to switch from the non-processing-in-memory mode to the processing-in-memory mode; and
delaying closing one or more rows in the one or more groups of memory banks that are idle while at least one processing-in-memory request is performed on another one or more groups of memory banks of the processing-in-memory block.

9. The method of claim 1, wherein the method is implemented in a memory controller coupled to the processing-in-memory block.

10. A system comprising:
a processing-in-memory block; and
a memory controller configured to:
switch into a processing-in-memory mode which interleaves processing-in-memory requests and memory requests; and
in the processing-in-memory mode:
identify one or more groups of memory banks of the processing-in-memory block that are idle while one or more processing-in-memory requests are being performed on the processing-in-memory block; and
issue one or more memory requests to the one or more groups of memory banks that are idle while the one or more processing-in-memory requests are being performed on the processing-in-memory block.

11. The system of claim 10, wherein the memory controller is further configured to:
determine a length of a processing-in-memory sequence that includes the one or more processing-in-memory requests; and
issue, based at least in part on the length, one or more memory requests to the one or more groups of memory banks that are idle.

12. The system of claim 10, wherein the memory controller is further configured to switch into the processing-in-memory mode in response to determining that the one or more memory requests have a priority level above a predetermined threshold.

13. The system of claim 10, wherein the memory controller is further configured to switch into the processing-in-memory mode in response to determining that memory command latency restrictions allow for higher command bandwidth when processing-in-memory requests and memory requests are interleaved than when processing-in-memory requests alone are issued.

14. The system of claim 10, wherein the memory controller is further configured to:
determine that the one or more processing-in-memory requests are unable to fully utilize a memory command bus; and
issue, in response to the one or more processing-in-memory requests being unable to fully utilize a memory command bus, the one or more memory requests to the one or more groups of memory banks that are idle.

15. The system of claim 10, wherein the memory controller is further configured switch into the processing-in-memory mode in response to determining that the one or more processing-in-memory requests will result in a first number of row buffer conflicts and a second number of row buffer hits, no more than the first number of memory requests that result in row buffer conflicts in the one or more groups of memory banks that are idle, and no more than the second number of memory requests that result in row buffer hits in the one or more groups of memory banks that are idle.

16. The system of claim 10, wherein the memory controller is further configured to:
determine to switch from the processing-in-memory mode to a non-processing-in-memory mode; and
while a last one or more processing-in-memory requests are being performed, close one or more rows in the one or more groups of memory banks that are idle and open a row targeted by a next memory request to be executed in the non-processing-in-memory mode.

17. The system of claim 16, wherein the memory controller is further configured to:
determine to switch from the non-processing-in-memory mode to the processing-in-memory mode; and
delay closing one or more rows in the one or more groups of memory banks that are idle while at least one processing-in-memory request is performed on another one or more groups of memory banks of the processing-in-memory block.

18. A computing device comprising:
a memory controller configured to:
switch into a processing-in-memory mode which interleaves processing-in-memory request and memory requests by issuing one or more memory requests to one or more groups of memory banks that are idle while one or more processing-in-memory requests are being performed on a processing-in-memory block; and
switch from the processing-in-memory mode to a non-processing-in-memory mode; and
while a last one or more processing-in-memory requests are being performed, close one or more rows in one or more groups of memory banks that are idle and open a row targeted by a next memory request to be executed in the non-processing-in-memory mode.

19. The computing device of claim 18, wherein the memory controller is configured to switch between the processing-in-memory mode and a non-processing-in-memory mode based on priority levels of processing-in-memory requests and memory requests.

20. The computing device of claim 18, wherein the memory controller is configured to switch between the processing-in-memory mode and a non-processing-in-memory mode based on a number of processing-in-memory requests and memory requests.

* * * * *